Nov. 2, 1965  B. C. COAD  3,215,512
COMPOSITE REFRACTORY ARTICLES
Filed June 9, 1961  2 Sheets-Sheet 1

Brian C. Coad,
Inventor.
Koenig, Pope, Senniger and Powers,
Attorneys.

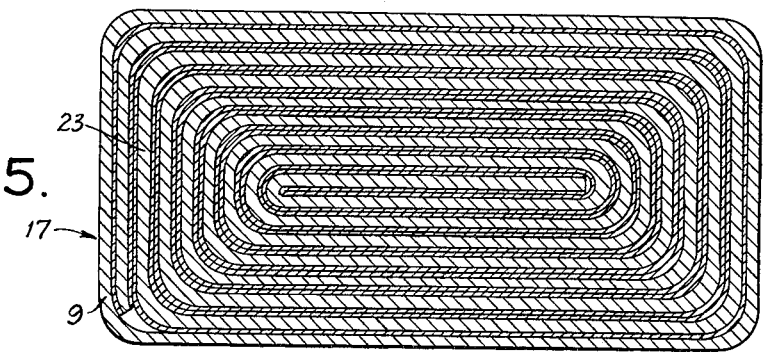
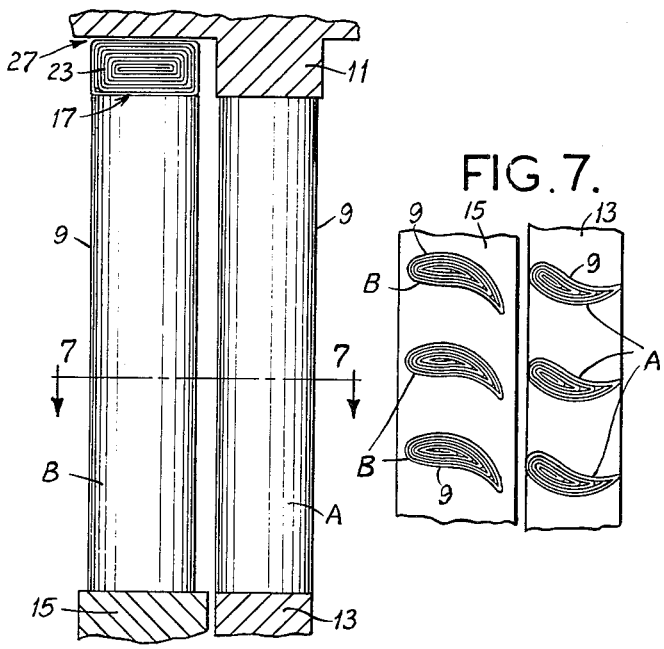
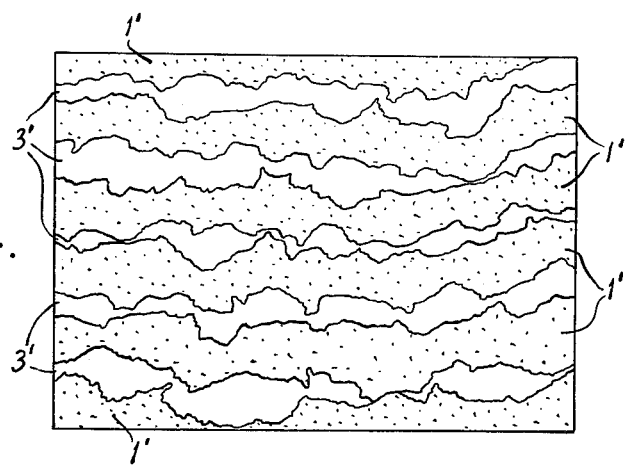

United States Patent Office 3,215,512
Patented Nov. 2, 1965

3,215,512
COMPOSITE REFRACTORY ARTICLES
Brian C. Coad, Attleboro, Mass., assignor to Texas Instruments Incorporated, Dallas, Tex., a corporation of Delaware
Filed June 9, 1961, Ser. No. 115,946
3 Claims. (Cl. 29—191)

This invention relates to the manufacture of oxidation-resistant refractory materials, and to oxidation-resistant articles made therefrom.

Among the several objects of the invention may be noted the provision of materials and articles composed primarily of highly reactive refractory metals for use in atmospheres which are reactive therewith, particularly at high temperatures, without catastrophic deterioration thereof; and the provision of a convenient process for the production of such materials and articles. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

In the accompanying drawings, in which several of various possible embodiments of the invention are illustrated, FIG. 1 illustrates a fragment of a clad metal sheet for use according to the invention;

FIG. 4 is a graphical reproduction of an enlarged photomicrograph of a small section of a laminate made according to the invention;

FIG. 5 is a view similar to FIG. 3 but showing another form of material resulting from deformation of a FIG. 2 jacketed assembly;

FIG. 6 illustrates turbine blades made from material such as shown in FIG. 3; and FIG. 7 is a cross section taken on line 7—7 of FIG. 6.

Thicknesses in the drawings are exaggerated for purposes of illustration. Corresponding reference characters indicate corresponding parts throughout the several views of the drawings. The term metal, as used herein includes alloys.

High-temperature, or so-called refractory metals, found in the groups IV–B, V–B, VI–B and VII–B of the periodic table, and alloys thereof, require protection against oxidation, particularly when used at high temperatures in air, because they are highly reactive with oxygen. They are also reactive with nitrogen. As a result, the use of such metals for high-temperature applications has been limited, particularly titanium (Ti), zirconium (Zr), hafnium (Hf), vanadium (V), columbium (Cb), tantalum (Ta) and molybdenum (Mo), which at present are the ones most useful for purposes of the invention. Of this group of seven, the five that are most practical at the present for use in the invention are Ti, Zr, Ta, Mo and Cb. A second choice is Hf and V.

There have been various proposals to provide oxygen- and nitrogen-resistant coatings on single layers of metals such as above mentioned, by cladding with cobalt and nickel base alloys or by electroplating with nickel, chromium or aluminum, followed by diffusion. Such methods suffer from the defect that the coatings are not self-healing. Thus if there is as little as a pinhole defect in the coating, allowing access of atmospheric gases at elevated temperatures to the single-layer refractory base metal, rapid complete or so-called catastrophic oxidation will follow.

According to the preferred form of the present invention, the refractory metals in the above category are protected with one or more relatively thin clad layers of an appropriately resistant metal on an interposed layer of the refractory metal. The resulting multi-ply material is then coiled, preferably jacketed, and worked by deformation to a desired shape. The result is a laminated structural material which has thin layers of an oxidation-resistant metal between adjacent layers of refractory metal. This spiral, open-loop structure provides an oxidation-resistant body which, while not necessarily self-healing, will not undergo catastrophic oxidation. This is because the oxidation process must at any given area traverse several protective layers in depth before all of the refractory metal can be oxidized or otherwise reacted. In another form of the invention, the result is obtained by means of a multi-layer, closed-loop arrangement which is also effective although at present not as economical to produce. An additional advantage of the invention is the comparatively high strength of devices and articles made from the laminated material. Thus the invention is useful for various critical devices such as furnace heating elements, gas turbine blades or buckets, heat exchanger tubes, rocket control vanes, et cetera.

Figure 1:
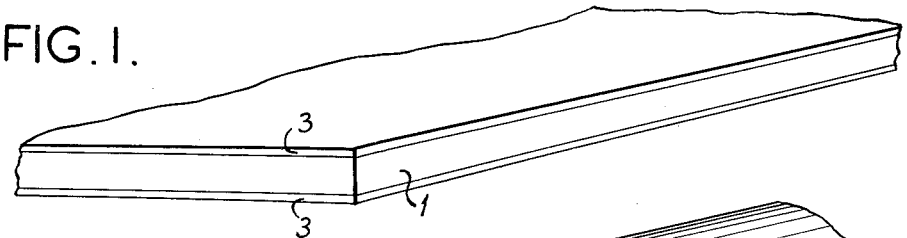

Referring now more particularly to FIG. 1, this diagrammatically shows a clad sheet consisting of a layer 1 composed of refractory molybdenum with opposite coatings 3 of a conventional nickel-chromium alloy. The claddings 3 may be metallurgically bonded to the layer 1 in any known manner such as, for example, by solid-phase bonding according to the disclosures in United States Patents 2,691,815 and 2,753,623, with or without sintering, solid-phase hot bonding by hot forging, rolling, extruding, swaging or pressing or the like, or liquid phase bonding by brazing, puddling, spraying and the like. For example, the bonded composite sheet of FIG. 1 may consist of 80% in thickness of layer 1, with coatings each 10% in thickness of a nickel-chromium alloy. This is rolled to the desired thickness after bonding. Layer 1, for example, after bonding may be 4 mils thick, and layers 3 each ½ mil thick, totaling 5 mils for the composite sheet after bonding and reduction by rolling.

Figure 2:
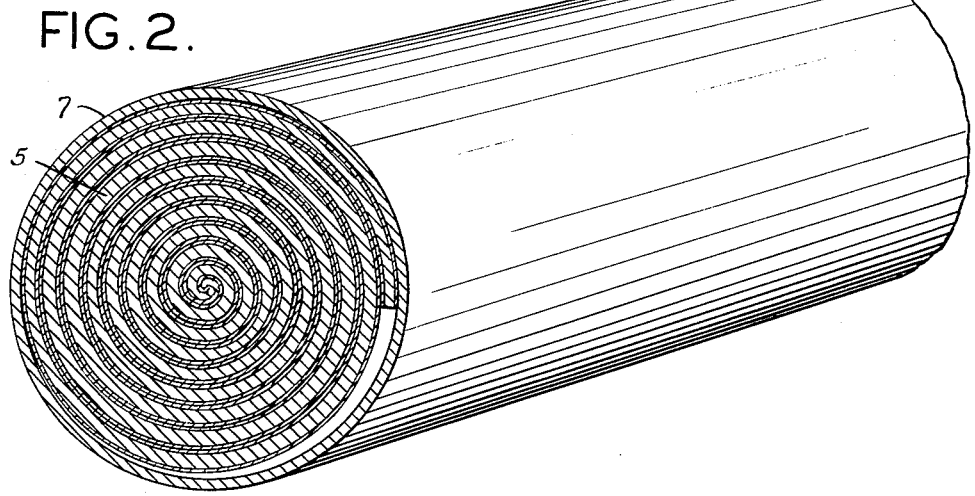
FIG. 2 illustrates an assembly consisting of a sheet such as shown in FIG. 1, coiled and inserted into a jacket.
Figure 3:
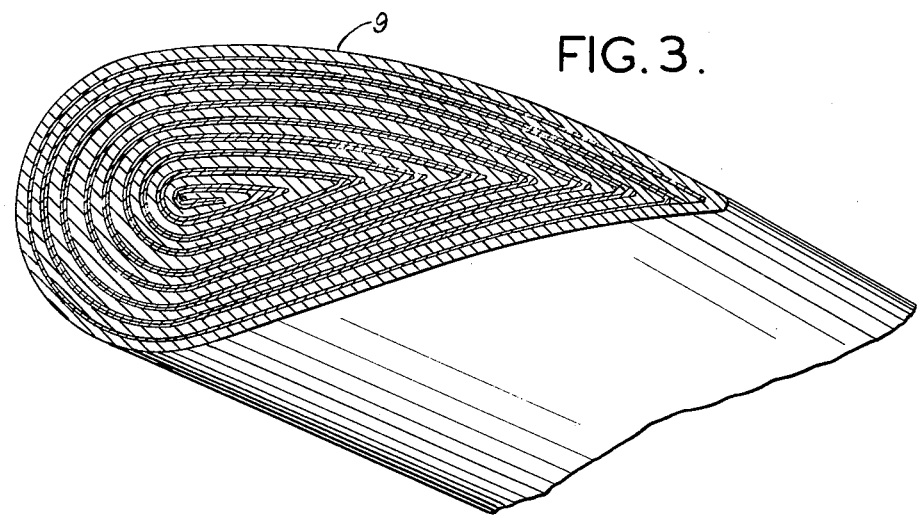
FIG. 3 shows a cross section of a length of material resulting from a typical deformation of the FIG. 2 jacketed assembly.

Next the bonded and rolled three-layer sheet above described is coiled tightly, as illustrated at 5 in FIG. 2. The resulting open-loop coil is preferably inserted into a holding jacket 7 composed, for example, of an oxidation-resistant material such as stainless steel. The jacketed assembly, as shown in FIG. 2, is then heated and forged, swaged, drawn or otherwise worked into smaller cylindrical or other appropriate shape. This is done under conditions of cleanliness, heat and pressure which will bond the interfaces between coils. For example, a teardrop cross-sectional shape is shown in FIG. 3, useful for constructing turbine blades as illustrated in FIGS. 6 and 7. The resulting product then consists of an outer skin 9 which is oxidation-resistant, within which are spirally continuous alternate layers of molybdenum and of the oxygen-resisting nickel-chromium alloy. Stated otherwise, the product consists of interleaved spiral layers of the refractory metal and of the protective material.

It will be understood that the outermost skin may comprise what remains of the jacket 7, or the jacket material may be removed after shaping, thus exposing the outermost layer of nickel-chromium alloy. In any event, there are continuous spirally arranged alternate layers of molybdenum and of the oxygen-resisting alloy. Should an outer resistant layer of protective alloy fail, the next inward layer of molybdenum will be lost, but the next innermost protective alloy layer will then become operative. Thus oxidation will proceed very slowly, so that destruction of an article made from the laminated material, instead of being catastrophic, will be gradual, and replacement will be possible before serious damage occurs.

If working to shape is accomplished by forging, it is possible to close in any open ends. The shapes which occur after working by extruding or like operations may have open ends. These may be suitably closed by welding on suitable protective capping or closure members composed of protective material. Closure may also be effected by prefolding the margins of the sheet material prior to coiling in such a way that exposed edges of refractory material are crossed by protective material, or by an upset forging operation on the end of the coiled and bonded structure, which would have a similar effect.

An illustration of another form of capping is given in FIGS. 5, 6 and 7. In these figures, the blades A are illustrated as being the stationary blades of a turbine. The opposite ends are covered by rings 11 and 13, constituting stationary parts of a turbine structure. Blades B are movable, their lower ends being covered by a rotor portion 15. The outer ends of the blades B are capped by a ring 17. Such a ring is formed from a forged or extruded bar shape bent into an annular form. The form is composed of a multi-layer sheet numbered 23 (see the half cross section of FIG. 5). In this case the spiral is also toroidal. The jacket may or may not be removed after shaping. The annular form is fitted protectively over the ends of the moveable blades B, as suggested in FIG. 6, and welded to the outer open ends of the blades B. Running clearance is left at 27.

In some cases, it may be desirable that refractory metals and cladding materials shall be selected so as to form protective intermetallic compounds during the bonding process, such intermetallic compounds being themselves oxygen- and nitrogen-resistant. One example of such a combination is aluminum or an aluminum-base alloy clad on tantalum. Thus tantalum may be clad on both sides with high-purity aluminum in a 20–60–20 thickness ratio and rolled to .005 inch to give a .001 inch aluminum cladding on each side of the tantalum. When this is heat-treated for an hour at 1,500° F. in an argon atmosphere, the components react to form an intermetallic compound which, as stated, is itself oxygen- and nitrogen-resistant. This produces a satisfactory composite material for subsequent working as above described.

Another example in this category is to double-clad a layer of tantalum by solid-phase bonding with aluminum facings in a 10–80–10 thickness ratio. The result was rolled to .005 inch thickness. The strip was then coiled tightly in a 3⅛ inch diameter stainless steel billet and extruded at 2,200° F. with a 17:1 reduction in cross-sectional area. The stainless steel jacket was afterward machined from the tantalum, leaving a cylindrical spirally layered billet for subsequent working into the desired particular shape. FIG. 4 shows a much-enlarged photomicrograph in cross section of a typical spiral laminate made according to the last-mentioned example, as it appears after bonding and deformation. Numerals 1' illustrate the final form of refractory layer 1 (tantalum). Numerals 3' illustrate the final form of the protective layers 3 of oxygen-resistant material (aluminum and/or an intermetallic compound such as an aluminide as may be obtained during the bonding and forming process). While FIG. 4 shows only a few layers, a given article may have scores of layers, easily obtained by spiralling long sheets of the thin clad material. As is apparent from FIG. 4, the layers 3' provide many successive barriers against any catastrophic oxidation of the tantalum layers 1'. It will be understood that, besides working the material to shape by forging, other processes may be employed for the purpose, such as drawing, pressing and the like. The term working includes such heating as may be required to effect bonding between loops.

Other examples of composite materials that may be employed are 2S aluminum, or aluminum-11.7% silicon alloy, clad on any of the refractory base metals Mo, Ta and Cb. In each such case, about .001 inch of cladding is employed on each side of a .010 inch refractory base metal. The result was then coiled and further processed as above described.

In addition to the nonoxidizing materials above-mentioned, other nonoxidizing protective materials may be employed such as ceramics, silicon, silicides, platinum and the like.

Although the sheet 1 is shown with cladding 3 on both sides, the invention might be carried out by cladding it on one side only. The result in the spiral form is the same, namely, alternate layers of refractory metal and protective material, requiring that any attack by oxidation will need to traverse one barrier after another of nonoxidizing material. In the case of one-sided cladding, its thickness should preferably be equal to the sum of the thicknesses of the double cladding, in order to have equivalent barriers of nonoxidizing materials in the spiral.

It will be understood that the protective layers 3 on refractive layer 1 (FIG. 1) may be obtained not only by starting with solid sheets 3, but also by starting with a powdered form of the protective material which is compacted and bonded by rolling and sintering, to provide one or more facings of the layer 1.

Another form in which the layered material may be obtained is to provide concentric closely fitting circular tubes of alternate refractory and protective materials to be placed in a jacket such as 7 for subsequent treatment, in order to bond the layers and to work them in their bonded condition into desired shapes, as described. However, it will be seen that, in either the spiral or a circular form of the layers, each forms a more or less complete loop encompassing at least 360 angular degrees.

In view of the above, it will be seen that in the various forms of the invention there is produced a refractory article comprising at least one pair (but preferably more pairs) of layers of a refractory metal, each pair sandwiching one layer of protective material, and at least one outer protective layer on an outermost refractory layer exposed in use to high-temperature atmosphere. Each layer is in the form of a loop. Successive loops may be elements of a continuous spiral, as in the spiral form described, or each loop may be individual and closed upon itself, as in the tubular form described. The spiral form is, however, preferable from the viewpoint of ease of manufacture into articles having many protective layers.

It will be understood in connection with all descriptions given above that the forging, extrusion or other forming processes are preferably to be carried out under known conditions such as will effect bonding between the adjacent layers 3 in the spiral. In general, it is preferable that the refractory material, as compared with the protective material sandwiched therebetween, shall constitute the preponderating bulk of the finished article.

In view of the above, it will be seen that the several objects of the invention are achieved and other advantageous results attained.

As various changes could be made in the above products and methods without departing from the scope of the invention, it is intended that all matter contained in the above description or shown in the accompanying drawings shall be interpreted as illustrative and not in a limiting sense.

I claim:

1. A composite refractory article for use in high temperature atmospheres comprising a plurality of interfacially metallurgically bonded loops each of which encompasses at least 360 angular degrees, each loop consisting of several layers of metal at least one of which is a refractory metal selected from metals in groups consisting of IV–B, V–B, VI–B and VII–B of the periodic table and alloys thereof which are highly reactive in an atmosphere at high temperatures including oxygen and nitrogen, and at least one protective layer of a solid material which is substantially nonreactive at high temperatures in an atmosphere including oxygen and nitrogen, said protective layer of material being selected from the group consisting of cobalt, nickel, nickel base alloys, chromium, platinum, silicon, silicides, oxygen-resistant ceramics and intermetallic compounds of aluminum with said metals in said groups in the periodic table.

2. A composite refractory metal article for use in high temperature atmospheres comprising a plurality of interfacially metallurgically bonded loops in continuous spiral form, each of which encompasses at least 360 angular degrees, each loop consisting of several layers of metal at least one of which is a refractory metal selected from a first group consisting of titanium, zirconium, hafnium, vanadium, columbium, tantalum and molybdenum and alloys thereof which are highly reactive in an atmosphere at high temperatures including oxygen and nitrogen, and at least one protective layer of material which is substantially nonreactive at high temperatures in an atmosphere including oxygen and nitrogen, said protective layer of material being selected from a second group consisting of cobalt, nickel, nickel base alloys, chromium, platinum, silicon, silicides, oxygen-resistant ceramics, and intermetallic compounds of aluminum with said metals in said first group.

3. A refractory article according to claim 2 wherein the total thickness of each loop is on the order of a few thousandths of an inch and the total thickness of the nonreactive metal in each loop is less than that of the reactive metal therein.

References Cited by the Examiner
UNITED STATES PATENTS

| | | | |
|---|---|---|---|
| 1,745,173 | 1/30 | Leonard | 29—191 |
| 1,769,622 | 7/30 | Chace | 29—191.6 |
| 2,258,327 | 10/41 | Kramer | 29—191 |
| 2,456,458 | 12/48 | Somerville | 29—155.61 |
| 2,721,952 | 10/55 | Kenyon | 29—198 X |
| 2,746,134 | 5/56 | Drummond | 29—198 X |
| 2,946,119 | 7/60 | Jones et al. | 29—470 |
| 2,982,017 | 5/61 | Drummond | 29—470 |

DAVID L. RECK, *Primary Examiner.*

HYLAND BIZOT, *Examiner.*